(12) United States Patent
Chung

(10) Patent No.: US 7,801,883 B2
(45) Date of Patent: Sep. 21, 2010

(54) METHOD AND APPARATUS FOR IMPROVING DATA PROCESSING SPEED THROUGH STORAGE OF RECORD INFORMATION OF IDENTITY MODULE

(75) Inventor: Woon-jae Chung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 11/333,209

(22) Filed: Jan. 18, 2006

(65) Prior Publication Data

US 2006/0161594 A1 Jul. 20, 2006

(30) Foreign Application Priority Data

Jan. 19, 2005 (KR) .................... 10-2005-0005032

(51) Int. Cl.
G06F 17/00 (2006.01)
G06F 17/30 (2006.01)
G06F 9/44 (2006.01)
G06F 9/445 (2006.01)

(52) U.S. Cl. .................... 707/713; 707/715; 717/168; 717/169; 717/175

(58) Field of Classification Search .......... 707/999.002, 707/999.003; 717/168, 169, 174, 175
See application file for complete search history.

(56) References Cited

U.S. PATENT DOCUMENTS

| 5,752,042 | A | * | 5/1998 | Cole et al. ............... 707/203 |
| 5,889,941 | A | * | 3/1999 | Tushie et al. ............... 726/26 |
| 5,946,634 | A | * | 8/1999 | Korpela ............... 455/552.1 |
| 6,278,913 | B1 | * | 8/2001 | Jiang ............... 701/3 |
| 6,452,908 | B1 | | 9/2002 | Yamada et al. |
| 6,714,778 | B2 | * | 3/2004 | Nykanen et al. ......... 455/414.1 |
| 6,824,064 | B2 | * | 11/2004 | Guthery et al. ............. 235/492 |
| 2003/0182414 | A1 | * | 9/2003 | O'Neill ............... 717/171 |
| 2004/0218609 | A1 | * | 11/2004 | Foster et al. ............... 370/401 |
| 2004/0260791 | A1 | * | 12/2004 | Jerbi et al. ............... 709/219 |

FOREIGN PATENT DOCUMENTS

| CN | 1538329 A | 10/2004 |
| CN | 1545357 A | 11/2004 |
| JP | 9-289524 A | 11/1997 |
| JP | 2000-358064 A | 12/2000 |
| JP | 2001-256442 A | 9/2001 |
| JP | 2002-374343 A | 12/2002 |
| JP | 2004-54433 A | 2/2004 |
| JP | 2004-178101 A | 6/2004 |
| KR | 2001-0048026 A | 6/2001 |
| KR | 2003-0075016 A | 9/2003 |

* cited by examiner

Primary Examiner—Vincent Boccio
(74) Attorney, Agent, or Firm—Sughrue Mion, PLLC

(57) ABSTRACT

A method and apparatus are provided for improving the data processing speed through the storage of the record information of an identity module. In the method for improving data processing speed, a request for input/output of at least one predetermined record stored in the identity module from an application is received. Metadata about the requested record of the identity module and the request are transmitted to the identity module. Results corresponding to the request are received from the identity module, and are transmitted to the application.

15 Claims, 9 Drawing Sheets

METHOD AND APPARATUS FOR IMPROVING DATA PROCESSING SPEED THROUGH STORAGE OF RECORD INFORMATION OF IDENTITY MODULE

This application claims priority from Korean Patent Application No. 10-2005-0005032 and filed on Jan. 19, 2005, in the Korean Intellectual Property Office, the disclosures of which are incorporated herein by reference in their entireties.

BACKGROUND OF THE INVENTION

1. Field of the Invention

Methods and apparatuses consistent with the present invention relate to improving data processing speed through the storage of the record information of an identity module.

2. Description of the Related Art

A Universal Subscriber Identity Module (USIM) or a Subscriber Identity Module (SIM) card is a kind of smart card that is inserted in terminals, such as Global System for Mobile communication (GSM) terminals, General Packet Radio Service (GPRS) terminals or Universal Mobile Telecommunications System (UMTS) terminals, and contains network information, roaming information, subscriber information such as a phone number or financial details, and security information such as user authentication information or data encryption information. This card is connected to a terminal, such as a mobile phone, thereby enabling communication. In Europe, services have changed from GSM to UMTS, and in North America, the next generation Code Division Multiple Access (CDMA) service has been introduced. The above-described USIM or SIM card allows the information required for communication to be separate from a terminal, thus enabling anyone holding the USIM card to communicate using any terminal.

A SIM card stores data as files, and allows files to be located under a directory in order to hierarchically manage information. In order to find the path of the files, an application requests a search procedure from the SIM card, so that the search procedure can be repeatedly performed depending on the depth of a directory.

Further, a SIM client (terminal) has better performance than a SIM server (SIM device). In contrast, the SIM server employs a single window mode of completing processing for a single command and transmitting a response notifying of command processing completion, and as a result the data processing scheme of the SIM server, that is, the SIM card, decreases system speed.

FIG. 1 is a diagram showing an example of the structure of a conventional User Identity Module (UIM) system. A UIM application program 10 transmits a command to a UIM task module 50 in order to read data stored in a UIM card 100, or to write data to the UIM card 100, and receives the results of the command processing. A UIM adaptation layer 80 processes the command transmitted by the UIM task module 50 in cooperation with a UIM device driver 90. Further, the UIM adaptation layer 80 transmits the results of the command processing to the UIM task module. In this case, the scheme for transmitting the results to the UIM task module is a single window mode. The single window mode is executed so that, if the UIM task module transmits a single command, the command is transmitted to the UIM device driver 90 through the UIM adaptation layer 80, and the UIM device driver 90 transmits the results of the command processing to the UIM task module. That is, the single window mode means that the UIM task module 50 cannot transmit a subsequent command to the UIM device driver 90 until a series of procedures has terminated. Therefore, when a corresponding command must be executed several times, the corresponding command is transmitted after each response has been received; this operation degrades the performance of the system. In particular, the servers 80, 90 and 100 for providing SIM related services are typically 8/16-bit class low speed devices exhibiting a significantly lower performance than clients, thus deteriorating the entire performance of the system.

FIG. 2 is a diagram showing a scheme for storing data in a conventional SIM card.

In the SIM card, data is stored in the form of a file called an Elementary File (EF), and the files have extensions such as Master File (MF), Dedicated File (DF) and Application DF (ADF). An MF is similar to a root directory, a DF denotes a sub-directory, and an ADF denotes the directory of an application program. A SIM standard defines the structure of MF, DF and ADF directories, and a user cannot change the directory structure. Data in the SIM card is stored in EF, which is an edge node, and the directory paths MF, DF and ADF do not contain information other than paths.

Therefore, in order to read or write data, all paths, MF, DF, ADF, and EF, on which the EF is located, are sequentially detected, and then data must be read from or written to a corresponding EF.

FIGS. 3A to 3C are diagrams showing examples of a file structure constituting SIM data.

A file structure is composed of a header and a body which stores data. As schemes for configuring a body, there are the three methods of FIG. 3A to 3C. First, FIG. 3A shows a transparent EF, in which data is stored in the form of a single piece of block data. The transparent EF is used to store a series of bit streams, such as the text of a Short Messaging Service (SMS) message. FIG. 3B shows a linear fixed EF, in which a series of records are sequentially stored. FIG. 3C shows a cyclic EF, which is a cyclic data structure, in which a series of records are sequentially stored and the last record points to the first record.

FIG. 4 is a flowchart of a process of reading data from a conventional UIM module. An application 10, that is, an application program, requests specific service information at operation S101. A UIM task module 50 performs a series of tasks to obtain the service information. First, the UIM task module 50 transmits a command for selecting a MF to a device driver 90 at operation S102. This is because all information is placed under the MF, as in MF/DF1/DF2/EF. As a response to the command, the device driver 90 transmits location information about the MF and information about lower directories constituting the MF at operation S103. The UIM task module 50 selects a first DF based on the received information at operation S104. Further, the device driver 90 transmits information constituting a first DF at operation S105. The UIM task module 50 selects a second DF based on the information at operation S106. The device driver 90 also transmits information constituting the second DF at operation S107. The UIM task module 50 selects a specific EF including a desired service at operation S108. The device driver 90 transmits information about data constituting the EF at operation S109. The UIM task module 50 selects a certain record to be read, and transmits information about the EF and the record at operation S101. Further, the device driver 90 transmits record information in response to the received information at operation S111. This procedure is repeatedly performed until all of the information about records to be read has been obtained.

As shown in FIG. 4, four accesses are required to detect the location of the EF so as to read a piece of data. If a task of reading a piece of data frequently occurs, commands required to detect the location may increase overhead. Further, the single window mode causes a bottleneck phenomenon.

Therefore, a method and apparatus are required for searching for and managing the location of a file regardless of the path of the file.

SUMMARY OF THE INVENTION

The present invention provides a method and apparatus for improving data processing speed between a terminal and an identity module.

The present invention also provides a method and apparatus for improving data processing speed, which caches information about records stored in an identity module, thus improving processing speed.

The present invention also provides a method and apparatus for improving data processing speed through the storage of the record information of an identity module.

In accordance with one aspect of the present invention, there is provided a method of improving data processing speed through storage of record information of an identity module, comprising the steps of receiving a request for input/output of at least one predetermined record stored in the identity module from an application, transmitting metadata about the requested record of the identity module and the input/output request to the identity module, and receiving results corresponding to the input/output request from the identity module and transmitting the results to the application.

In accordance with another aspect of the present invention, there is provided an apparatus for improving data processing speed through storage of record information of an identity module, comprising an application communication unit for receiving a request for input/output of at least one predetermined record stored in the identity module from an application, a node information search unit for searching for metadata about the requested record, and an identity module communication unit for transmitting found metadata and the input/output request to the identity module.

BRIEF DESCRIPTION OF THE DRAWINGS

The above aspects of the present invention will be more apparent by describing certain exemplary embodiments of the present invention with reference to the accompanying drawings, in which.

DESCRIPTION OF THE EXEMPLARY EMBODIMENTS

The meaning of terms used in the present specification is described in brief in the following. However, it should be notified that the description of the terms is used to help the understanding of the present specification and the terms are not intended to limit the technical spirit of the present invention when not explicitly described as items limiting the present invention.

SIM, UIM and USIM (Identity Module)

A Subscriber Identity Module (SIM), which is a user authentication card, is a kind of smart card that is inserted in a terminal and which contains network information, roaming information, subscriber information such as a phone number or financial details, and security information such as user authentication information or data encryption information. This card is connected to a terminal, such as a mobile phone, in order to perform communication.

A User Identity Module (UIM), which is a kind of CDMA SIM card that provides the functionality of a SIM card, has been introduced by CHINA UNICOM.

A Universal Subscriber Identity Module (USIM) is the extended version of the SIM card, and it is a third-generation mobile communication chip card for accommodating both SIM and UIM. Future third-generation asynchronous services will require the USIM card as an essential component.

An "identity module" as used in the present specification is a concept that includes the SIM, UIM, USIM and other similar information storage medium.

Task Module

A task module provides an interface required to transfer (input/output) data between an application and an identity module and to use the functions of the identity module, as in the case of a UIM task module. The task module functions to convert a specific action into a command recognizable by a device driver when the execution of the specific action is requested by the application, and to convert a response into a format recognizable by the application when the response is received from the device driver.

Figure 5:
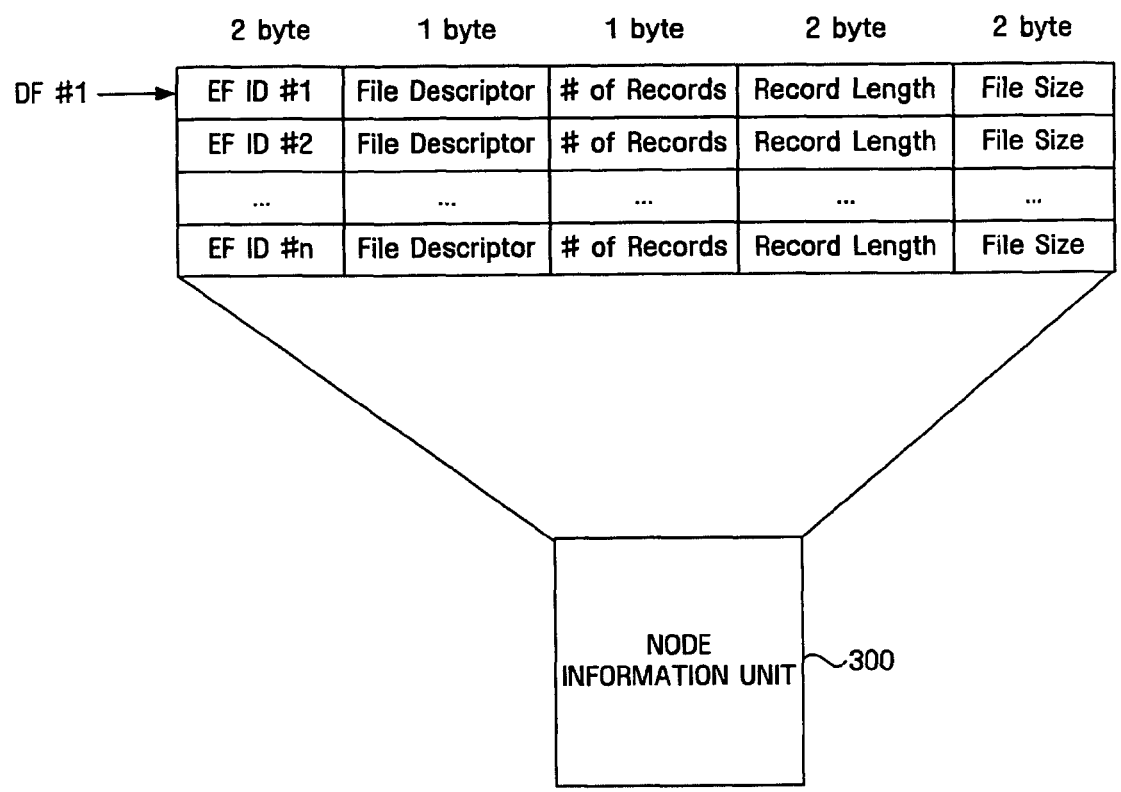
FIG. 5 is a table showing the construction of a node information unit according to an exemplary embodiment of the present invention.

FIG. 5 is a table showing the construction of a node information unit according to an exemplary embodiment of the present invention.

Figure 1:
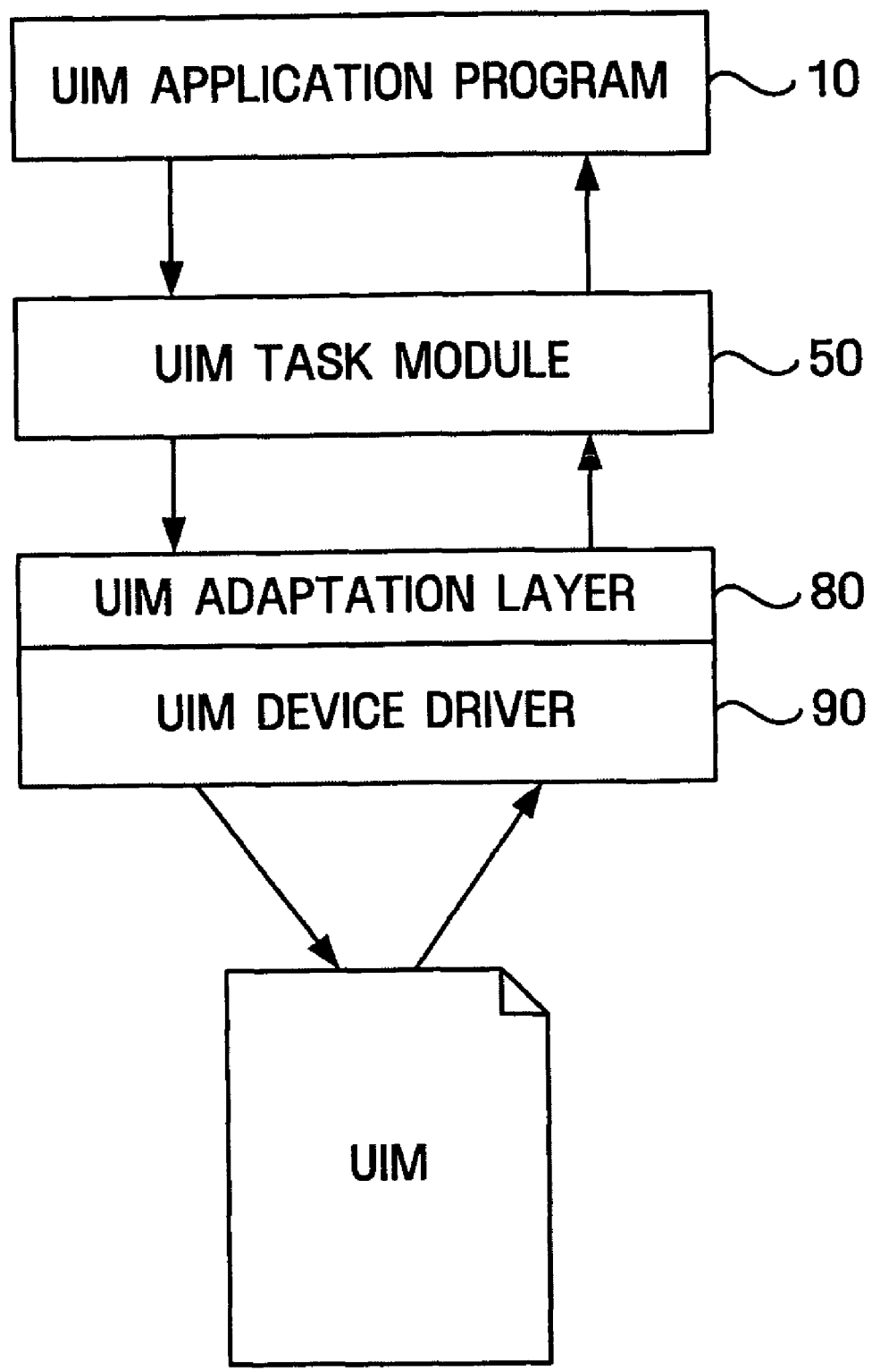
FIG. 1 is a diagram showing an example of the structure of a conventional UIM system.
Figure 2:
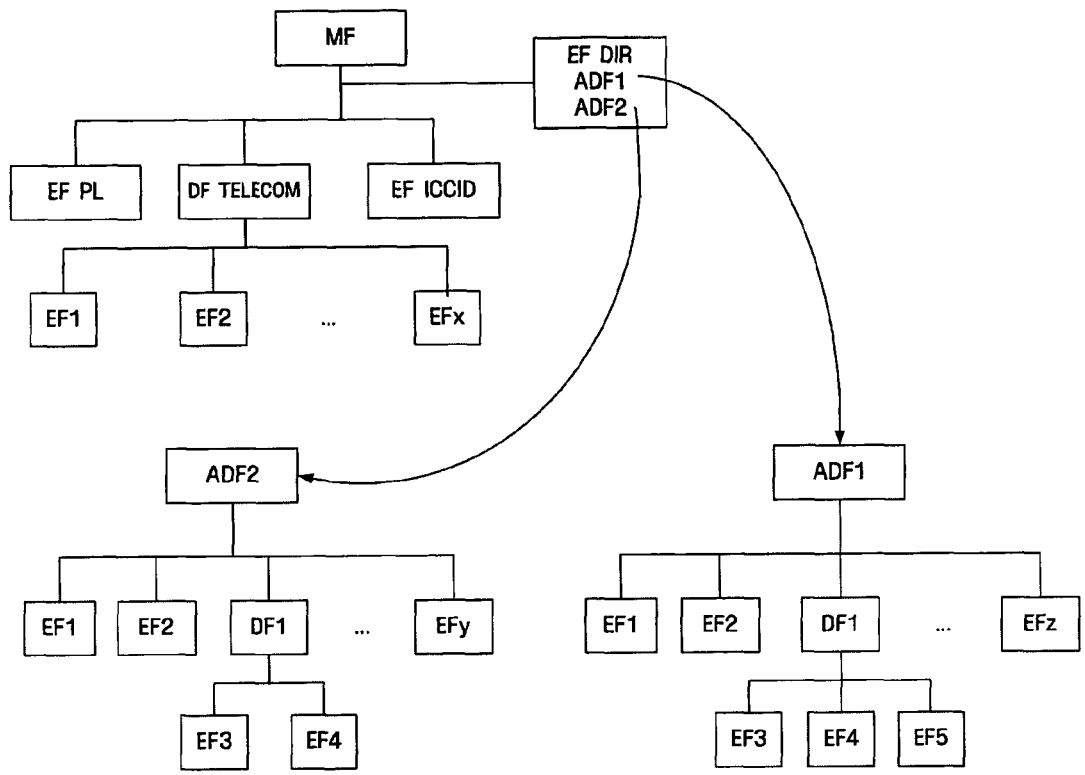
FIG. 2 is a diagram showing a scheme for storing data in a conventional SIM card.

The node information unit is a module for storing information about directories stored in an identity module. A node means a directory including one or more files. In FIG. 2, a node includes directories such as MF, DF TELECOM, ADF1, ADF2, DF1 (ADF1) and DF1 (ADF2).

The node information unit stores information stored in the identity module, that is, metadata about records. The metadata may include records, that is, the location and size of the file, and the number of records included in the file.

The node information unit stores the location of directories and the type of files included in each directory, as in the case of a database. The node information unit includes entry information about each EF, and is updated when the directories of the identity module are searched. The EF entry information may include a file identifier (EF ID), a file descriptor, a file size, the number of records, and the length of records. Therefore, the number of node information units is proportional to the number of directories.

EF information stored in the node information unit can be classified according to the properties of records provided to an application. And, the EF information can be data of a file which contains records. Each record contains phone book information, short message information, network roaming information, and called phone numbers.

An EF includes these records. Therefore, an application needing to find a phone book can search for EF information corresponding to the phone book and perform a task related to the phone book.

In FIG. 2, there are a total of six directories: MF, DF TELECOM, ADF1, ADF2, DF1 (of ADF1) and DF1 (of ADF2), and six registration procedures are required. The MF node has entry information about a file EF PL and a file EF Integrated Circuit Card Identifier (ICCID). The DF TELECOM node has entry information about x files EF1, EF2, . . . , EFx. The ADF1 node includes entry information about z files; the ADF2 node includes entry information about y files; the DF1 node existing below the ADF1 node includes entry information about the files EF3, EF4 and EF5, and the DF1 node existing below the ADF2 node includes entry information about the files EF3 and EF4. All of the entry information may be metadata about records.

The node information unit may be stored in memory or a database of a communication terminal, or it may reside in a task module. The original node information unit may exist in an identity module, such as a SIM card or a UIM card. Further, when a communication terminal is connected to the identity module, the original node information unit may be duplicated and stored in memory or a database of the communication terminal. Typically, when the identity module is connected to the communication terminal, data exchange occurs, and an initial setting procedure is performed. Accordingly, if information is read in advance during the initial setting procedure, the time required can be reduced. The node information unit is required to increase search speed, and preferably, but not necessarily, stores data in a structured format such as a table. Further, the node information unit stores information about records or nodes existing in the identity module, similar to a cache, and uses the information. Accordingly, when there is a change in records, synchronization must be performed to make a corresponding change in the node information unit.

Through the use of the node information unit shown in FIG. 5, information about the files located in a specific directory, the number and size of records, the size of files, and others can be determined. The task module can reduce a search time and promptly input or output data through the node information unit. Further, the task module minimizes a duplicate task in the case of multiple commands, thus improving processing speed.

Figure 6:
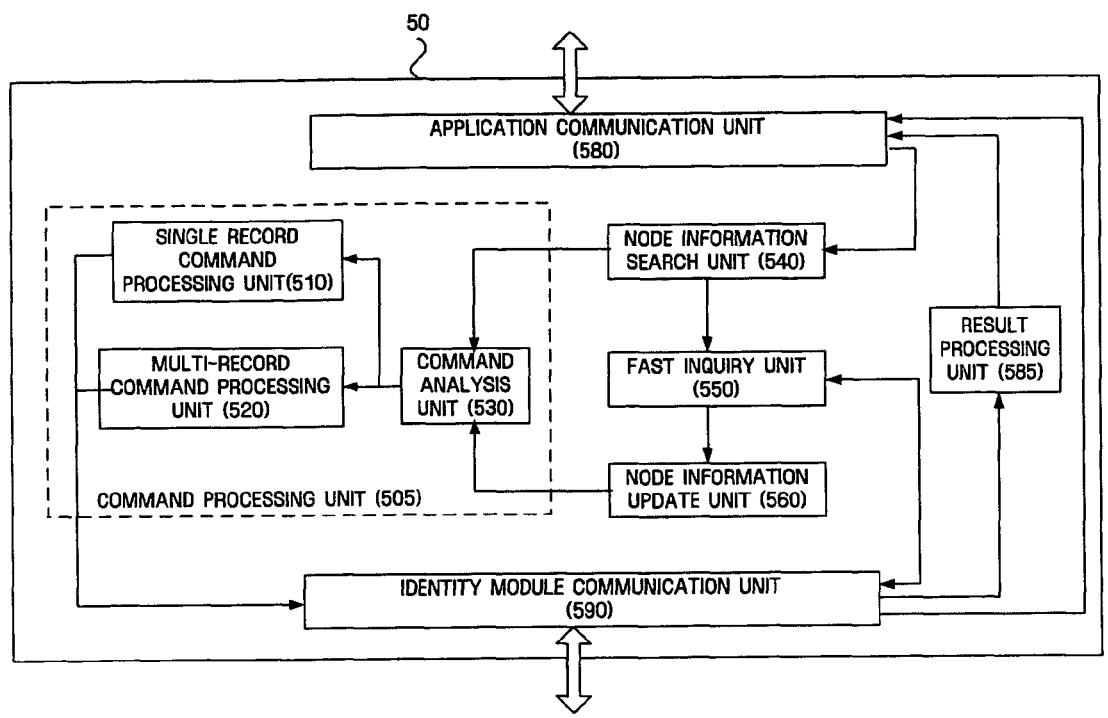
FIG. 6 is a diagram showing the construction of the components of a task module according to an exemplary embodiment of the present invention.

FIG. 6 is a diagram showing the construction of the components of a task module according to an exemplary embodiment of the present invention.

Terms including "unit", used in the exemplary embodiment of the present invention, that is, "module" or "table", denote software components, or hardware components, such as a Field-Programmable Gate Array (FPGA) or an Application Specific Integrated Circuit (ASIC). Each module executes certain functions. A module can also be implemented so as to reside in an addressable storage medium, or to run on one or more processors. Therefore, as an example, a module includes various components, such as software components, object-oriented software components, class components and task components, processes, functions, attributes, procedures, sub-routines, segments of program code, drivers, firmware, microcode, circuits, data, databases, data structures, tables, arrays and variables. The components and modules can be combined into a small number of components and modules, or can be separated into additional components or modules. Moreover, components and modules can be implemented to drive one or more Central Processing Units (CPUs) in a device or security multimedia card.

A task module 50 includes a single record command processing unit 510, a multi-record command processing unit 520, a command analysis unit 530, a node information search unit 540, a fast inquiry unit 550, a node information update unit 560, an application communication unit 580, a result processing unit 585, and an identity module communication unit 590.

The node information update unit 560 receives file status information from an identity module and performs the task of updating file status information, in a node information unit, and managing the file status information. When the identity module is connected to a communication terminal, the node information update unit 560 receives node or directory information and stores the node or directory information in the node information unit. The node information update unit 560 receives node information from the identity module communication unit 590. Meanwhile, since the information stored in the node information update unit 560 is required to search for records and update details, which occurs when records are stored or deleted, it must be applied to the node information unit so as to realize synchronization.

When a service request or data input/output request for the identity module is externally received from an application, etc., the node information search unit 540 searches the node information unit for related information. The node information search unit 540 receives a command from the application communication unit 580, and searches for a node corresponding to the command. The node information search unit 540 determines whether a corresponding EF exists in the node information unit. If no corresponding EF exists, the node information update unit 560 can create a table composed of information about all EFs that constitute a node or a directory including the corresponding EF.

The fast inquiry unit 550 provides the function for searching for a file quickly when desired data, to be searched for by the node information search unit 540, does not exist. That is, if desired EF information does not exist in the node information unit, the fast inquiry unit 550 acquires information about a parent node of the EF. The fast inquiry unit 550 also provides the function for reading in advance information about nodes, directories and files included in the identity module through the identity module communication unit 590 when the identity module is initially connected to a terminal. The read data is stored in the node information unit by the node information update unit 560.

Figure 3A:
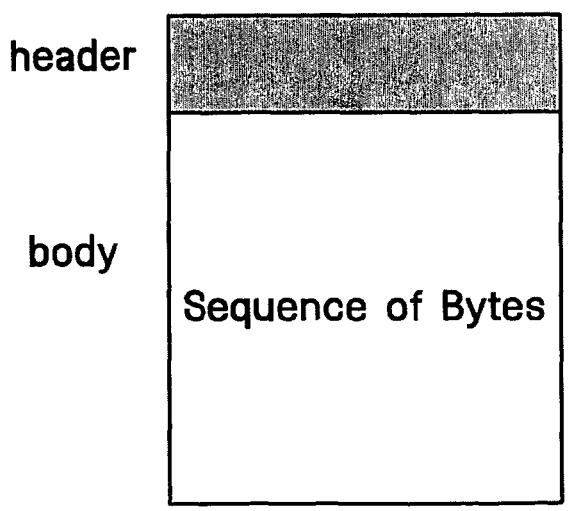
FIGS. 3A to 3C are diagrams showing examples of a file structure constituting SIM data.
Figure 3B:
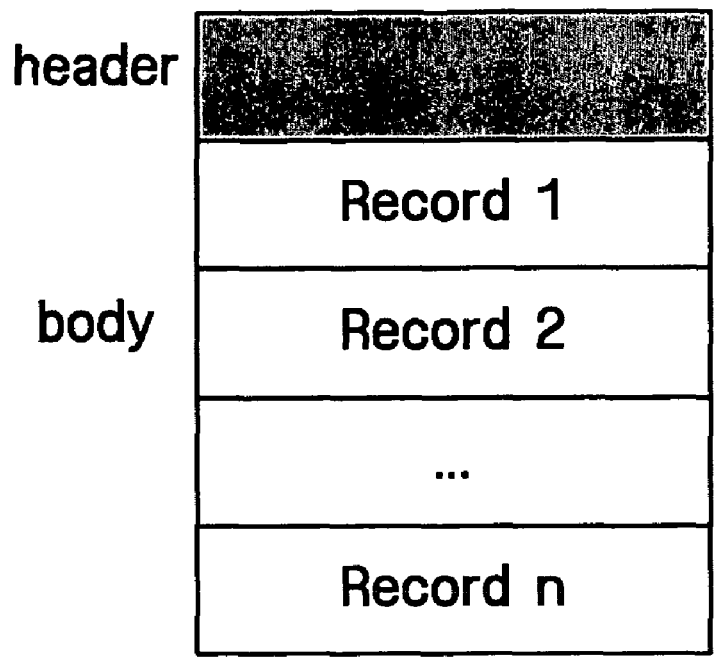
Figure 3C:
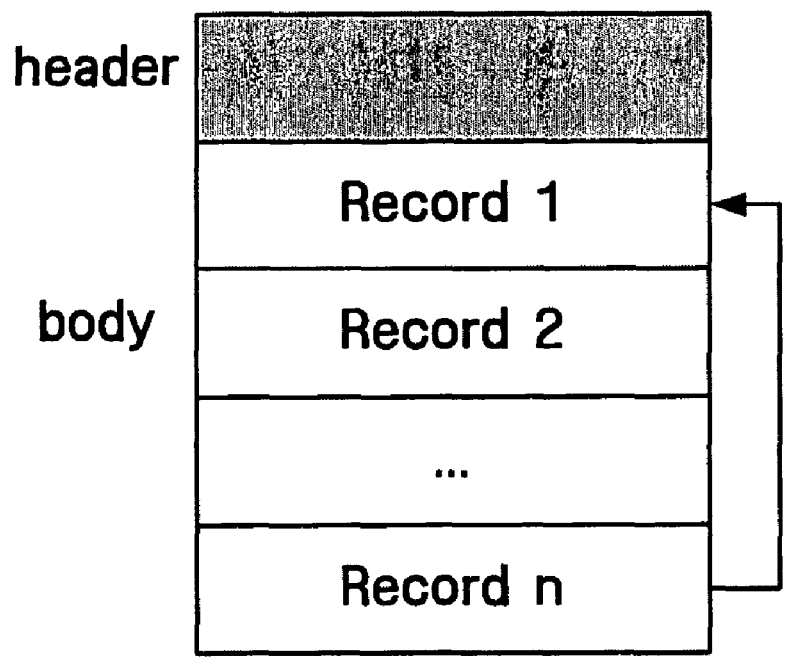
Figure 4:
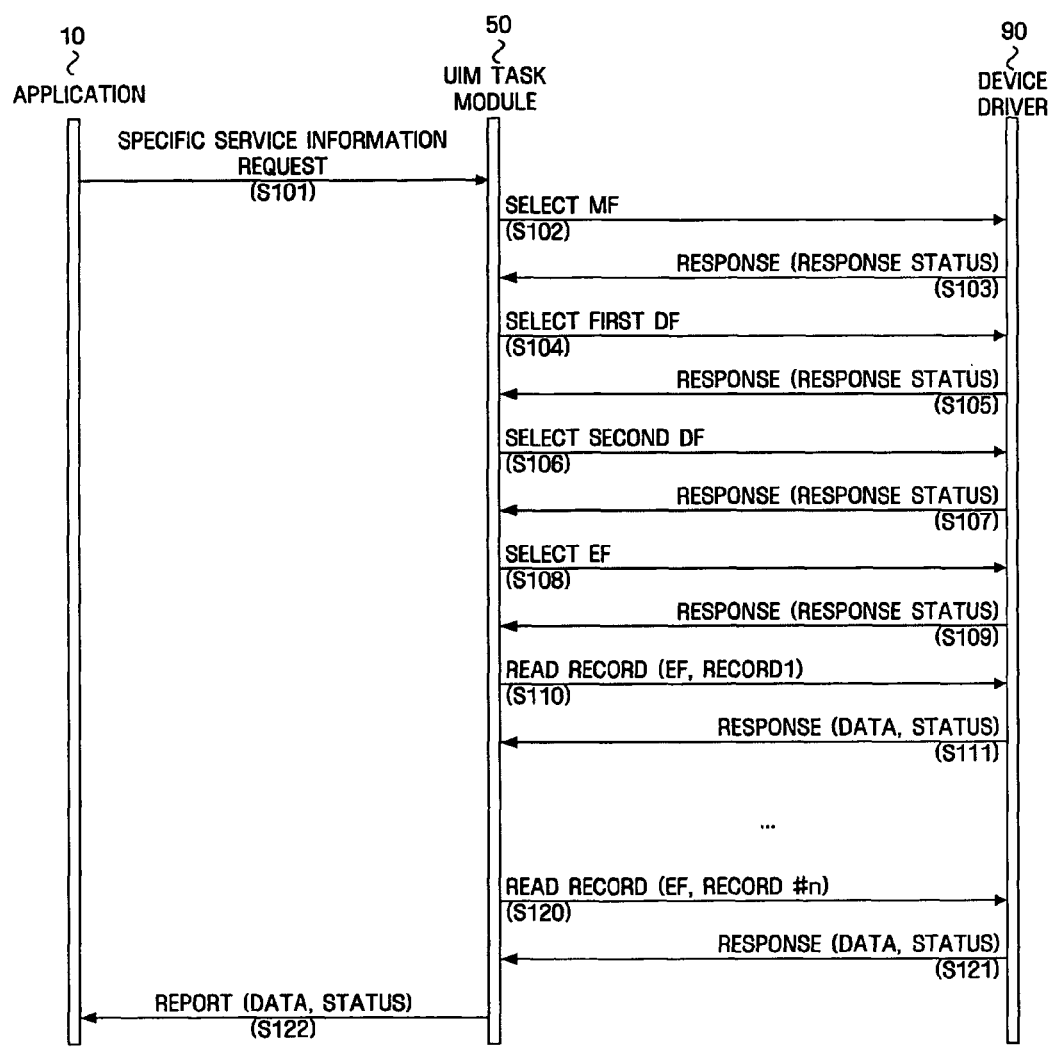
FIG. 4 is a flowchart of a process of reading data from a conventional UIM.

A command processing unit 505, which is a component for processing commands, includes the command analysis unit 530, the single record command processing unit 510, and the multi-record command processing unit 520. The command analysis unit 530 analyzes a command for a service request or data input/output request that is externally received from an application, etc., and determines whether the command is related to a single record or multiple records. Depending on the result of the determination, a method of processing the command is determined. The command analysis unit 530 analyzes EF information, and is then capable of determining whether the command is a multi-record command requiring the transmission of multiple records at one time, or a single record command requiring the transmission of a single record, depending on the type of files in FIG. 3.

The single record command processing unit 510 processes a command when the command analysis unit 530 determines the command to be a command for a single record. For example, this command could be for reading, writing or deleting a single record.

The multi-record command processing unit 520 processes a command when the command analysis unit 530 determines the command to be a command for multiple records. For example, this command could be for reading, writing or deleting two or more records; specifically, deleting the phone numbers of two or more persons, or deleting an entire phone book.

The application communication unit 580 receives a command from an application, transmits the command to the node information search unit 540, receives the results of the command processing from the identity module communication unit 590 or the result processing unit 585, and transmits the results of the command processing to the application.

The identity module communication unit 590 performs the function of reading data from the identity module and transmitting a command generated by the command processing unit 505 to the identity module. Further, the identity module communication unit 590 transmits the results of the command processing, provided by the identity module, to the application communication unit 580. The results may be transmitted to the result processing unit 585 so that they are processed according to the requirements of the application.

The result processing unit 585 processes the results, received by the identity module communication unit 590, according to requirements of the application and transmits the processed results to the application communication unit 580.

As described above, the node information unit 300 may be stored in the memory of a terminal device. In this case, the node information search unit 540 of the task module 50 can search for node information through the input/output operation of the memory. Meanwhile, if the task module 50 has an independent memory it may contain a node information unit 300.

Figure 7:
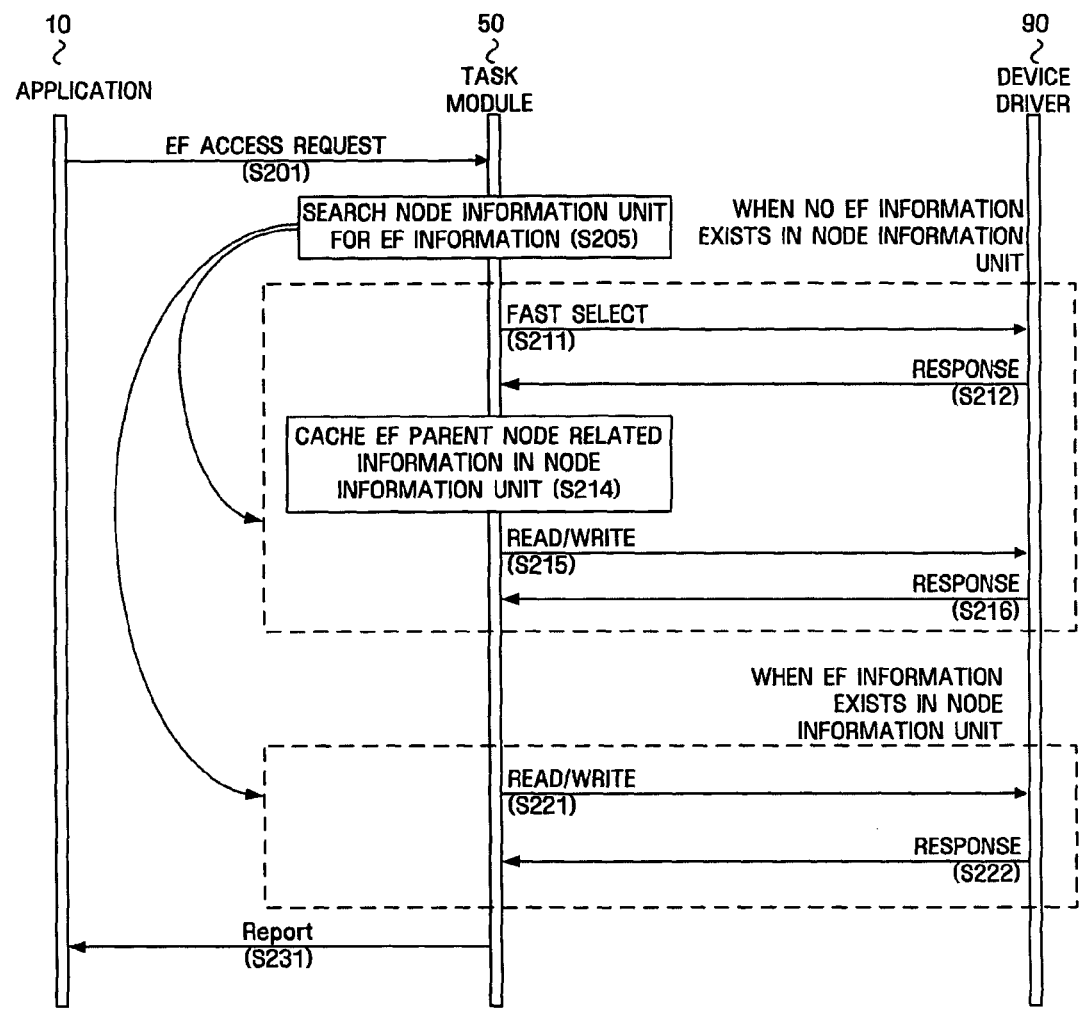
FIG. 7 is a sequence diagram showing a process that executes differently depending on whether node information is stored in a node information unit according to an exemplary embodiment of the present invention.

FIG. 7 is a sequence diagram showing a process that executes differently depending on whether node information is stored in a node information unit according to an exemplary embodiment of the present invention.

An application 10 requests a task module 50 to access a specific file (EF) at operation S201. The task module 50 searches the node information unit for information about the EF at operation S205. As a result of the search, if no information about the EF exists in the node information unit, a task for reading information including the specific file EF is required. The fast inquiry unit 550 of FIG. 6 reads node information from an identity module. The task module 50 requests fast search (fast select) from a device driver 90 at operation S211, and reads information about one or more EFs constituting a specific node or directory DF1 that includes the desired file EF, as a response to the request at operation S212. The information about EFs is cached in the node information unit at operation S214. Also, the information about the specific file EF to be searched for at operation S201 is also included in the information about EFs. Based on the information, the task module 50 performs a task of reading or writing the EF at operation S215. Further, the task module 50 receives the results of the task processing at operation S216.

If information about the EF exists in the node information unit at operation S205, the location of the EF can be determined using the EF information. Therefore, a task of reading or writing the EF is immediately performed at operation S221. Further, the task module 50 receives the results of the task processing at operation S222.

The task module 50 reports the results received at operation S216 or S222 to the application 10 at operation S231.

Figure 8:
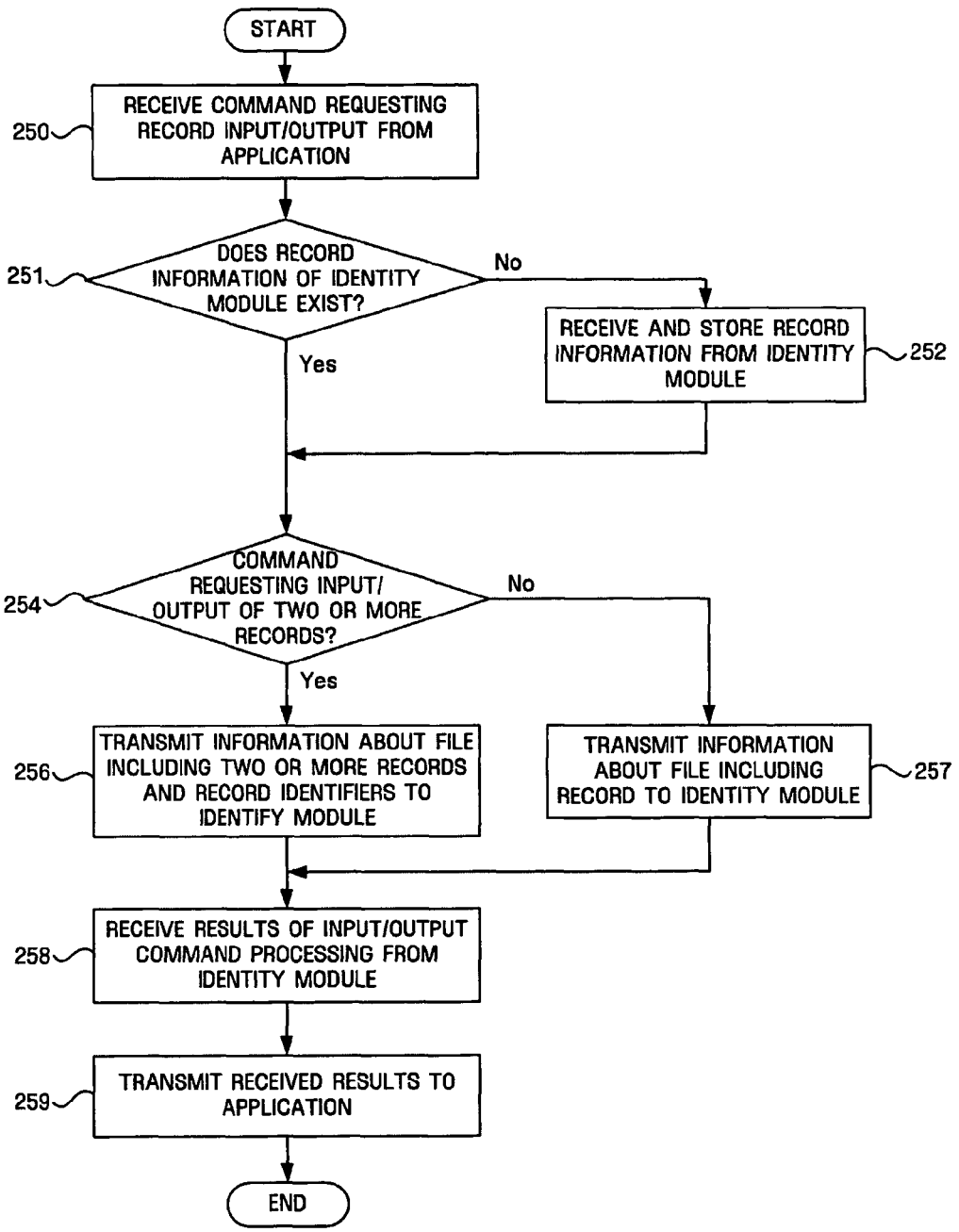
FIG. 8 is a flowchart of a process where a task module receiving and using node information according to an exemplary embodiment of the present invention.

FIG. 8 is a flowchart showing a process of a task module receiving and using node information according to an exemplary embodiment of the present invention.

The task module receives a command for requesting the input/output of a record from an application at operation S250. The command for requesting the input/output of a record can vary according to the properties of a terminal, and includes inputting, outputting or deleting phone numbers, or inputting or outputting user information. The command can vary according to the type of data to be input or output by the terminal, that is, according to the application. The task module determines whether metadata about the record of the identity module exists at operation S251. This metadata may be information about the location of a file (e.g., in the identity module) which contains the desired record. Sets of information stored in the node information unit of FIG. 5 may be metadata about the record. Examples of this metadata include information about the location and size of a file in which the record is stored, and the number of records constituting the file. If metadata about the record exists, the record can be input or output using the metadata. If no metadata about the record exists, the task module receives metadata from the identity module and stores it at operation S252. The received metadata is stored in the node information unit. When a command for the input/output of a record is received later, the node information unit can be referred to. If no metadata about the desired record for exists in the node information unit, operation S252 is performed so that the metadata can be stored in the node information unit.

Before the record input/output command is executed based on the metadata stored in the node information unit, the task module determines whether the record input/output command is a command requesting the input/output of two or more records at operation S254. If the record input/output command is a command requesting the input/output of two or more records, the command must be processed in order to be transmitted immediately, unlike the conventional method of transmitting an input/output command several times. If the record input/output command is a command requesting the input/output of two or more records at operation S254, the task module transmits information about a file including the records and record identifiers to the identity module at operation S256. Information indicating that a corresponding command is an input/output command for multiple records may be additionally transmitted to the identity module. Meanwhile, if the record input/output command is a command requesting the input/output of a single record, the task module transmits information about a file including the record, and record information to the identity module at operation S257. In this case, a conventional input/output method can be used. The task module receives the results of processing of the command transmitted to the identity module at S258, and reports them to the application at operation S259. In this case, the received results may be processed according to requirements of the application.

Figure 9:
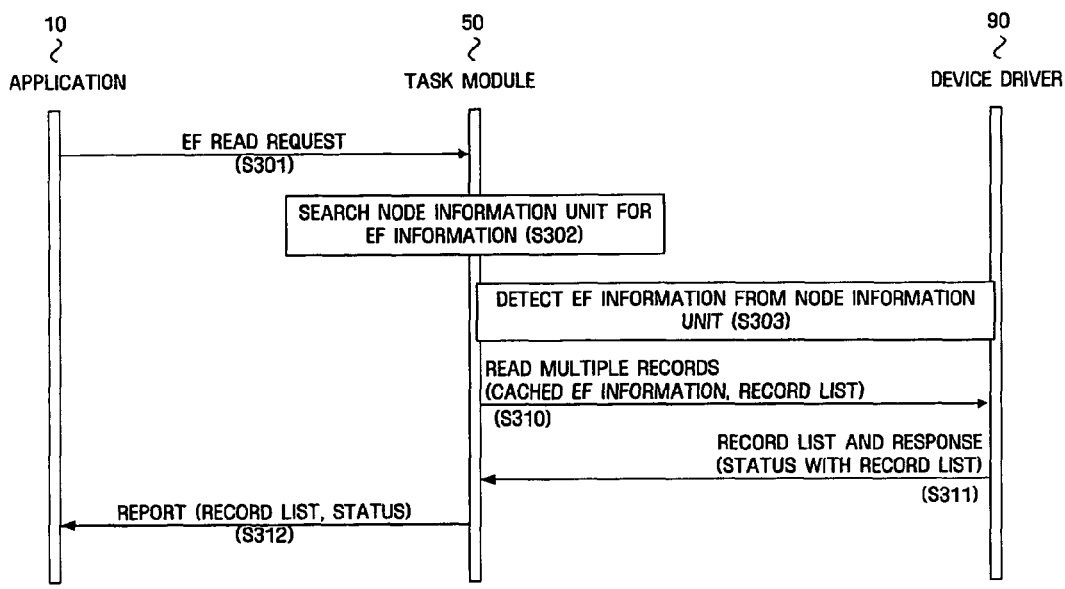
FIG. 9 is a sequence diagram showing a process of reading multiple records according to an exemplary embodiment of the present invention.

FIG. 9 is a sequence diagram showing a process of reading multiple records according to an exemplary embodiment of the present invention.

An application 10 sends an EF read request to a task module 50 at operation S301. The EF read request is an operation of requesting records stored in a file EF. For example, an operation of reading a plurality of phone numbers or an operation of reading a plurality of call details corresponds to the EF read request. The type of data stored in the EF may be classified according to the EF. If a phone number is stored in EF 1 and an SMS message is stored in EF 2, an application determines which EF is to be accessed depending on a purpose. Further, information about the EF is stored in the node information unit.

The task module 50 searches the node information unit for the EF information at operation S302 to determine whether information about the location and size of the EF, the number of records, and others is stored there. If the information is stored, the task module 50 detects the EF information from the node information unit at operation S303, and the location of the EF can be determined using the detected EF information. If the EF location and a list of records are transmitted together to the device driver 90 at operation S310, the device driver 90 reads records from the EF location and transmits the records to the task module 50 at operation S311. The task module 50 reports the received record list to the application at operation S312. Before transmission, the record list can be processed according to requirements of the application.

Figure 10:
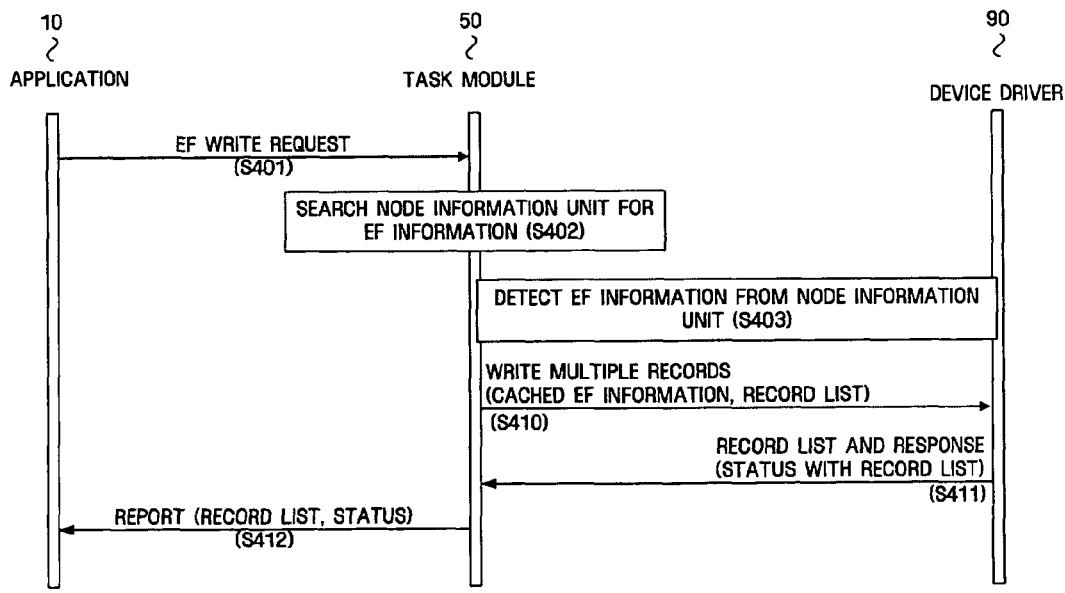
FIG. 10 is a sequence diagram showing a process of writing multiple records according to an exemplary embodiment of the present invention.

FIG. 10 is a sequence diagram showing a process of writing multiple records according to an exemplary embodiment of the present invention.

An application 10 transmits an EF write request to a task module 50 at operation S401. The EF write request means an operation of storing, changing or deleting certain records in an EF. For example, an operation of deleting a plurality of phone numbers, an operation of receiving a plurality of phone numbers from an external application and storing the phone numbers, or an operation of receiving multiple records and storing the records corresponds to the EF write request. The task module 50 searches the node information unit for EF information at operation S402. The task module 50 determines whether information about the location and size of the EF, the number of records, and others is stored in the node information unit, and detects the EF information (if it exists) at operation S403. The location of the EF can be determined using the detected EF information. If the EF location and a list of records to be written are transmitted together to the device driver 90 at operation S410, the device driver 90 writes records in the EF location, and transmits the records to the task module 50 at operation S411. The task module 50 reports the received record list to the application at operation S412. Before transmission, the record list can be processed according to requirements of the application.

Those skilled in the art will appreciate that the present invention can be implemented in other detailed forms without departing from the scope and spirit of the invention. Therefore, it should be understood that the above exemplary embodiments are only exemplified in all aspects and are not restrictive. The scope of the present invention should be defined by the attached claims, rather than the detailed description. All additions, substitutions or modifications derived from the meaning and scope of the accompanying claims and equivalent concept thereof should be interpreted as being included in the scope of the present invention.

Accordingly, an aspect of the present invention is that it can improve the data processing speed of processes between a terminal and an identity module.

Further, another aspect of the present invention is that it caches information about records stored in an identity module, thus improving the data processing speed.

What is claimed is:

1. A method of improving data processing speed between a device and an identity module through a storage of record information of the identity module, the method comprising:

receiving a request from an application of the device for input or output of at least one record, which is stored in the identity module under a directory in order to hierarchically manage information;

transmitting metadata about the at least one record and the request to the identity module; searching for results using the request and the metadata; and receiving the results corresponding to the request from the identity module and transmitting the results to the application, wherein the transmitting the metadata is performed to transmit metadata about at least two records and information about the at least two records to the identity module if the request is a request for the at least two records.

2. The method according to claim 1, further comprising receiving the metadata about the at least one record from the identity module.

3. The method according to claim 1, wherein the metadata about the at least one record selectively includes i) a location of a file that includes the at least one record, an identifier of the file, a number of records, a length of records, and a size of the file, if the request is for the output, or ii) the location of the file associated with the at least one record, the identifier of the file, the number of stored records, the length of stored records, and the size of the file, if the request is for the input.

4. The method according to claim 1, further comprising converting the request into a command to be transmitted to the identity module.

5. The method according to claim 1, wherein the at least one record includes at least one of phone book information, short message information, network roaming information, and information about called phone numbers.

6. The method according to claim 1, wherein the identity module is one of a Subscriber Identity Module (SIM) card, a User Identity Module (UIM) card and a Universal Subscriber Identity Module (USIM) card.

7. The method according to claim 1, wherein the at least one record is stored in the identity module.

8. An apparatus for improving the data processing speed between a device and a identity module through a storage of record information of the identity module, the apparatus comprising:

an application communication unit which receives a request from an application of the device for input or output of at least one record, which is stored in the identity module under a directory in order to hierarchically manage information;

a node information search unit which searches for metadata about the at least one record; and an identity module communication unit which transmits the metadata and the request to the identity module, wherein the metadata and the request transmitted to the identity module are used to search for the at least one record, wherein the command processing unit transmits metadata about at least two records and information about the at least two records to the identity module if the request, received by the application communication unit, is a command for the at least two records.

9. The apparatus according to claim 8, further comprising a command processing unit which converts the request received by the application communication unit into a command to be transmitted to the identity module.

10. The data processing speed improvement apparatus according to claim 8, further comprising a node information unit which stores information about nodes of the identity module.

11. The apparatus according to claim 8, further comprising:
 a fast inquiry unit which receives the metadata about the at least one record from the identity module; and
 a node information update unit which stores in a node information unit the node information received by the fast inquiry unit.

12. The apparatus according to claim 8, wherein the metadata about the at least one record selectively includes i) a location of a file that includes the at least one record, an identifier of the file, a number of stored records, a length of the stored records, and a size of the file, if the request is for the output, or ii) the location of the file associated with the at least one record, the identifier of the file, the number of stored records, the length of stored records, and the size of the file, if the request is for the input.

13. The apparatus according to claim 8, wherein the at least one record includes at least one of phone book information, short message information, network roaming information, and information about called phone numbers.

14. The apparatus according to claim 8, wherein the identity module is one of a Subscriber Identity Module (SIM) card, a User Identity Module (UIM) card and a Universal Subscriber Identity Module (USIM) card.

15. The apparatus according to claim 8, wherein the at least one record is stored in the identity module.

\* \* \* \* \*